(12) United States Patent
Fairchild et al.

(10) Patent No.: US 8,204,909 B2
(45) Date of Patent: *Jun. 19, 2012

(54) METHOD AND APPARATUS PROVIDING OMNIBUS VIEW OF ONLINE AND OFFLINE CONTENT OF VARIOUS FILE TYPES AND SOURCES

(75) Inventors: Granville R. Fairchild, Mount Pleasant, SC (US); Bill Frischling, Great Falls, VA (US); John Keeling, Reston, VA (US); Dan Pacheco, Falls Church, VA (US); Myron Rosmarin, Reston, VA (US)

(73) Assignee: AOL Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/072,487

(22) Filed: Mar. 25, 2011

(65) Prior Publication Data
US 2011/0173544 A1 Jul. 14, 2011

Related U.S. Application Data

(60) Division of application No. 12/892,788, filed on Sep. 28, 2010, now Pat. No. 8,135,744, which is a continuation of application No. 10/716,781, filed on Nov. 18, 2003, now Pat. No. 7,885,974.

(60) Provisional application No. 60/426,807, filed on Nov. 18, 2002.

(51) Int. Cl.
*G06F 17/30* (2006.01)
(52) U.S. Cl. ..................................... 707/783
(58) Field of Classification Search ............... None
See application file for complete search history.

(56) References Cited

U.S. PATENT DOCUMENTS

| | | | | |
|---|---|---|---|---|
| 5,805,858 A * | 9/1998 | Kumamoto et al. | ............... | 703/1 |
| 5,878,384 A * | 3/1999 | Johnson et al. | ............... | 702/187 |
| 5,964,839 A * | 10/1999 | Johnson et al. | ............... | 709/224 |
| 6,804,674 B2 * | 10/2004 | Hsiao et al. | ............... | 1/1 |
| 6,813,645 B1 * | 11/2004 | Meyer | ............... | 709/245 |
| 6,985,905 B2 | 1/2006 | Prompt et al. | | |
| 7,930,215 B2 * | 4/2011 | Pombo et al. | ............... | 705/26.1 |
| 2002/0169658 A1 * | 11/2002 | Adler | ............... | 705/10 |
| 2003/0120502 A1 * | 6/2003 | Robb et al. | ............... | 705/1 |
| 2004/0054569 A1 * | 3/2004 | Pombo et al. | ............... | 705/7 |

(Continued)

OTHER PUBLICATIONS

"iLife FAQ"—http:// www.apple.com; copyright 2003; 2 pages.

(Continued)

*Primary Examiner* — Farhan Syed
(74) *Attorney, Agent, or Firm* — Michael A. Glenn; Glenn Patent Group

(57) ABSTRACT

An online service provider (OSP) operates online data centers to store members' data objects relating to various online member services of the OSP. An aggregated catalog lists members' data objects residing in the online data centers and also those residing in member computers' local storage. An aggregator monitors contents of the online storage facilities to detect new storage of prescribed types of data objects owned by the members, and also communicates with member computers to identify prescribed types of data objects newly stored in the respective local storage. The aggregator updates the aggregated catalog to list the newly stored data objects. Responsive to a request by a member, a finder searches the aggregated catalog and utilizes results of the search to provide, for display at the requesting member's computer, a consolidated listing of online data objects and locally stored data objects owned by the requesting member.

7 Claims, 4 Drawing Sheets

U.S. PATENT DOCUMENTS

2011/0153465 A1* 6/2011 Pombo et al. ............... 705/27.1

OTHER PUBLICATIONS

"Internet Essentials for your Mac"—http://www.apple.com; copyright 2003; 1 page.

".Mac FAQs"—http://www.apple.com; copyright 2003; 5 pages.

"Introducing iLife"—http://www.apple.com; copyright 2003; 2 pages.

* cited by examiner

METHOD AND APPARATUS PROVIDING OMNIBUS VIEW OF ONLINE AND OFFLINE CONTENT OF VARIOUS FILE TYPES AND SOURCES

CROSS-REFERENCE TO RELATED APPLICATIONS

This application is a divisional of U.S. application Ser. No. 12/892,788, now U.S. Pat. No. 8,135,744 entitled METHOD AND APPARATUS PROVIDING OMNIBUS VIEW OF ONLINE AND OFFLINE CONTENT OF VARIOUS FILE TYPES AND SOURCES, filed on Sep. 28, 2010 in the names of Fairchild et al., which is a continuation of U.S. application Ser. No. 10/716,781, entitled METHOD AND APPARATUS PROVIDING OMNIBUS VIEW OF ONLINE AND OFFLINE CONTENT OF VARIOUS FILE TYPES AND SOURCES, filed on Nov. 18, 2003 in the names of Fairchild et al., now U.S. Pat. No. 7,885,974 (hereinafter "the '974 patent"). The '974 patent claims the benefit of one of more of the following earlier filed applications in accordance with one or more of 35 USC 119, 120, 365: U.S. Provisional Application No. 60/426,807 entitled MULTICOMPONENT BRIDGE AND METHOD filed on Nov. 18, 2002 in the names of Rubin et al. The entirety of the foregoing applications are hereby incorporated herein by reference.

BACKGROUND OF THE INVENTION

1. Field of the Invention

The present invention relates to computer-driven data management systems. More particularly, the invention concerns a method and apparatus for performing an omnibus search providing a consolidated view of an online service subscriber's online and local data objects, and for conducting additional operations such as viewing, changing, and sharing the data objects.

2. Description of the Related Art

With the advent of the "information superhighway" various online services came into existence. These services provide tools for an incredible variety of functions for their users, which may be one-time guest or long term subscribers. These online services enable users to search the worldwide web, store digital photographs online, read news stories, send and receive e-mails, and well as many other tasks. One side effect of these many services is the explosion of data that somehow has to be stored, organized, managed, and otherwise processed.

One of the leading Internet access and online content providers today AMERICA ONLINE CORPORATION (AOL). Although different online data management systems already exist, and some may even enjoy significant publicity and use today, AOL engineers and software designers are continually seeking to improve the performance, efficiency, and functionality of such systems. In this spirit, one area of possible focus concerns the difficulty that online users face in reconciling, managing, and comprehending the assortment of data objects dispersed among various online and offline storage sites.

SUMMARY OF THE INVENTION

An online service provider (OSP) operates online data centers to store members' data objects relating to various online member services of the OSP. An aggregated catalog lists members' data objects residing in the online data centers and also those residing in member computers' local storage. An aggregator monitors contents of the online storage facilities to detect new storage of prescribed types of data objects owned by the members, and also communicates with member computers to identify prescribed types of data objects newly stored in the respective local storage. The aggregator updates the aggregated catalog to list the newly stored data objects. Responsive to a request by a member, a finder searches the aggregated catalog and utilizes results of the search to provide, for display at the requesting member's computer, a consolidated listing of online data objects and locally stored data objects owned by the requesting member.

DETAILED DESCRIPTION

The nature, objectives, and advantages of the invention will become more apparent to those skilled in the art after considering the following detailed description in connection with the accompanying drawings.

Hardware Components & Interconnections

Introduction

Figure 1:
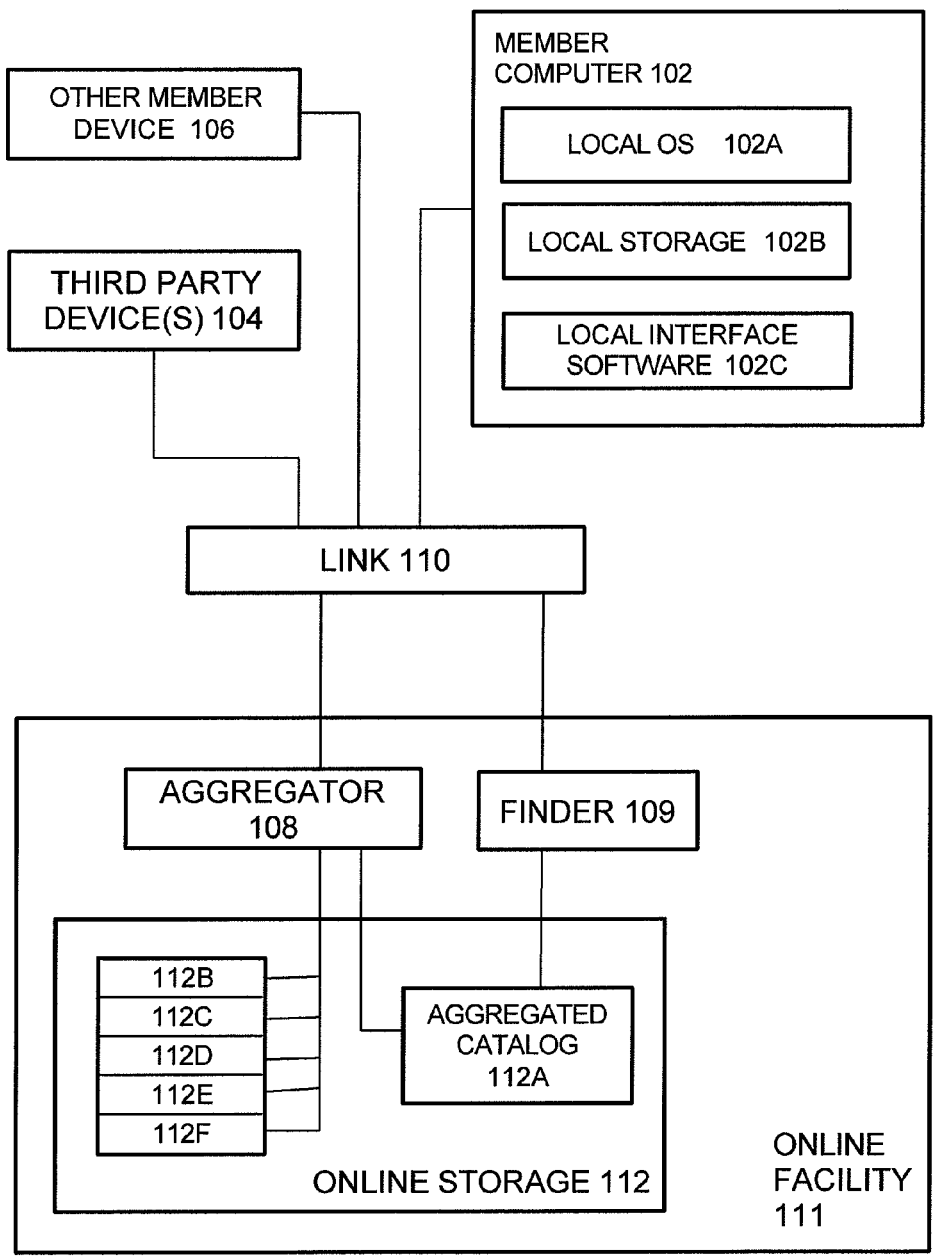
FIG. 1 is a block diagram of the hardware components and interconnections of a data management system.

One aspect of the invention concerns a data management system, which may be embodied by various hardware components and interconnections, with one example being described by the system 100 of FIG. 1. The system 100 includes various subcomponents, each of which may be implemented by one or more hardware devices, software devices, a portion of one or more hardware or software devices, or a combination of the foregoing. The makeup of these subcomponents is described in greater detail below, with reference to an exemplary digital data processing apparatus, logic circuit, and storage medium.

An online facility 111, whose construction and functionality is described below, is maintained and operated by an online service provider (OSP). The facility 111 is accessed by various members that subscribe to online services. More specifically, the online facility 111 of the present example is accessed by member computer 102, another member device 106, and one or more third party devices 104.

Devices that Access Online Facility

The member computer 102 comprises a PC, MAC, notebook computer, computer workstation, or other digital data processor of a given user ("member") that participates in services offered by the OSP. The device 106 represents a different device of the same member, such as another PC, Mac, notebook computer, computer workstation, or the like, or a different type of device such as a personal data assistant (PDA), web-enabled wireless phone, etc. The third party devices 104 also comprise devices such as 102 and/or 106, but they are operated by somebody other than the member 102.

The computer 102 includes a local operating system (OS) 102a, local storage 102b, and local interface software 102c.

The local OS 102a comprises an operating system such as WINDOWS, UNIX, LINUX, MAC OS, etc. The interface software 102c comprises an interface between the local OS 102a and the online finder 109.

The local storage 102b comprises magnetic hard disk storage, optical storage, circuit memory, or another suitable media, format, or mechanism for storing digital data. Local storage 102b contains various data, some related to services of the OSP and the present disclosure, and other unrelated data. As for the data related to the present disclosure, these comprise various data objects of prescribed types that are relevant to the operation of the aggregator 108 and finder 109. Although the prescribed types of data object are explained in detail below, some examples include digital photographs, sent/received e-mails and any related e-mail attachments, digital music, videos, and the like. These data objects are presumed to be "owned" by the member since they are present in the member's local storage.

The computer 102 also includes local software 102c for interfacing with an online finder (109) described below. As discussed below, the software 102c works with the local OS 102a and finder 109 to present an omnibus view of all the member's data objects, whether online or local. In one example, the software 102c may be implemented as a plug-in to the member's web browser component of the local OS 102a (such as MS INTERNET EXPLORER) or a plug-in to the member's disk management software (such as MS WINDOWS EXPLORER).

Link to Online Facility

The components 102, 104, 106 are coupled to the online facility 111 by one or more links 110. Such coupling may be "always one", for example DSL or cable, or it may occur at selected times, for example by dial-up telephone access. The links 110 may comprise wired communications links, wireless links, satellite, telephone lines, DSL lines, cable connections, public Internet, private Intranet, Ethernet cards, wide or local area networks, or any other arrangement suitable for the purposes described herein. The link 110 includes appropriate equipment to modulate/demodulate, encode/decode, multiplex, and perform other processing to connect many users to the online facility 111.

Online Storage

The online facility 111 includes an aggregator 108, finder 109, and online storage 112. The storage 112 comprises digital data storage, which may utilize similar storage media (for example) as the local storage 102b (discussed above). The online storage 112 contains an aggregated catalog 112a and a number of online data centers 112b-112f. The data centers 112b-112f comprises repositories for storing various data objects related to members' participation in different online services offered by the OSP. These data objects may be of the same type (e.g., photographs, e-mails, videos, etc.) as those in local storage 102b, or of different types, or a mix. The various units 112b-112f of online storage may comprise geographically, physically, and/or functionally separate entities that are normally not associated with each other, other than being separately offered by the OSP to its members. For instance, one data center 112b may comprise a server (or other storage facility) that manages members' e-mails, whereas another data center 112c comprises a server that hosts members' photographs, and another data center 112d comprises a server that stores members videos. Depending upon the implementation details, multiple data centers 112b-112f may optionally comprise physical or logical devices, registers, address ranges, devices, disk surfaces, or other subcomponent of the same storage device. As one specific example, the data centers 112b-112f may be implemented using the existing storage architecture that AOL utilizes to serve its members.

The aggregated catalog 112a contains (1) metadata concerning prescribed types of data object that are stored in the disparate data centers 112b-112f and owned by the members, and also (2) metadata concerning the prescribed types of data objects locally stored (102b) by the members. Some examples of the prescribed "types" of metadata may include digital photographs, e-mails sent and/or received, e-mail attachments send and/or received, financial portfolio information, alerts & reminders, calendar information, favorites, personal filing cabinet contents, address book, instant messenger data, message board contents, music, videos, etc. A data object is "owned" by members, for example, when the member has access to the data object and the ability to delete, change, or otherwise manipulate the data object.

The metadata 112a includes some categories of information that apply to all data objects types, such as filename, file type, author, storage location, size, creation date, member-supplied captions or comments, keywords, etc. The metadata also includes other information specific to particular data object types, such as image size/resolution for images, to/from and other mail-related fields for e-mails, etc. The catalog 112 may be implemented by (some or all of) one or more of the following structures: a table, list, file, collection of files, physical storage device, relational database, linked list, etc.

Aggregator

The aggregator 108 comprises software, hardware, firmware, application specific integrated circuits, logic circuitry, or any other instrumentality for carrying out the aggregator functionality described below. Broadly, the aggregator 108 prepares, updates, and maintains the catalog 112a so that its metadata accurately reflects the data objects residing in the data centers 112b-112f and local storage 102b. The aggregator also oversees sharing of any data objects from 112b-112f or 102b to third party devices 104. To achieve greater speed, the aggregator 108 may be implemented by a number of processors, software threads, or other units working together.

Finder

The finder 109 comprises software, hardware, firmware, application specific integrated circuits, logic circuitry, or any other instrumentality for carrying out the finder functionality described below. Broadly, the finder 109 works under member direction to provide the member computer 102 with an omnibus view of all the member's data objects, whether online or offline.

In addition to the online finder 109 as illustrated (or as an alternative), there may be local finders such as a finder (not shown) installed locally at the member computer 102. In this case, the local computer may optionally include a local version of the aggregated catalog 112a to speed operation of the local finder. The online and local catalogs may be synchronized as needed by the aggregator 108, local finder, online finder 109, or other suitable component.

Exemplary Digital Data Processing Apparatus

As mentioned above, data processing entities such as the finder 109, aggregator 108, and the like may be implemented in various forms. One example is a digital data processing apparatus, as exemplified by the hardware components and interconnections of the digital data processing apparatus 200 of FIG. 2.

The apparatus 200 includes a processor 202, such as a microprocessor, personal computer, workstation, controller, microcontroller, state machine, or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, battery backup RAM, EEPROM, flash PROM, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204, 206, and/or 208 may be provided on-board the processor 202, or even provided externally to the apparatus 200.

Logic Circuitry

In contrast to the digital data processing apparatus discussed above, a different embodiment of the invention uses logic circuitry instead of computer-executed instructions to implement some or all of the processing entities in the system 100. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Operation

Having described the structural features of the present invention, the operational aspect of the present invention will now be described.

Storage Media

Figure 2:
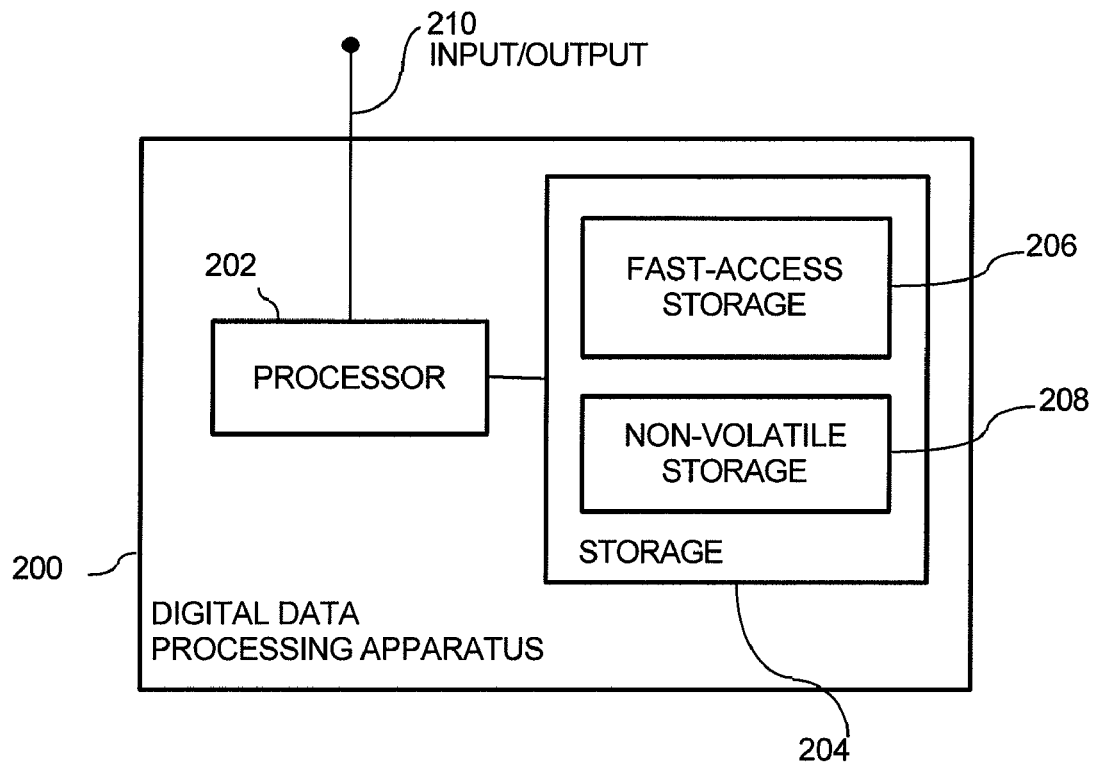
FIG. 2 is a block diagram of a digital data processing machine.
Figure 3:
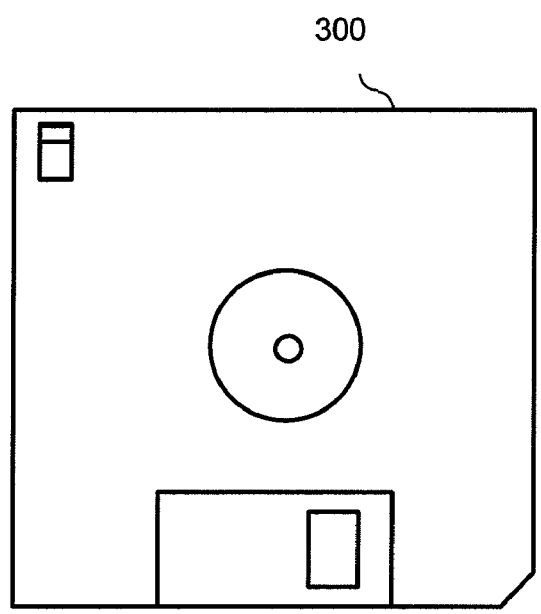
FIG. 3 shows an exemplary storage medium.

Wherever the functionality of a component of this disclosure is implemented using one or more machine-executed program sequences, these sequences may be embodied in various forms of storage media. In the context of FIG. 2, such a storage media may comprise, for example, the storage 204 or another storage media, such as a magnetic data storage diskette 300 (FIG. 3), directly or indirectly accessible by a processor 202. Whether contained in the storage 206, diskette 300, or elsewhere, the instructions may be stored on a variety of machine-readable data storage media. Some examples include direct access storage (e.g., a conventional "hard drive", redundant array of inexpensive disks ("RAID"), or another direct access storage device ("DASD")), serial-access storage such as magnetic or optical tape, electronic nonvolatile memory (e.g., ROM, EPROM, flash PROM, or EEPROM), battery backup RAM, optical storage (e.g., CD-ROM, WORM, DVD, digital optical tape), paper "punch" cards, or other suitable storage media including analog or digital transmission media and analog and communication links and wireless communications. In an illustrative embodiment of the invention, the machine-readable instructions may comprise software object code, compiled from a language such as assembly language, C, etc.

Logic Circuitry

In contrast to the storage medium discussed above, some or all of a component's functionality may be implemented using logic circuitry, instead of using a processor to execute instructions. Such logic circuitry is therefore configured to perform operations to carry out the method of the invention. The logic circuitry may be implemented using many different types of circuitry, as discussed above.

Background Operations

Figure 4:
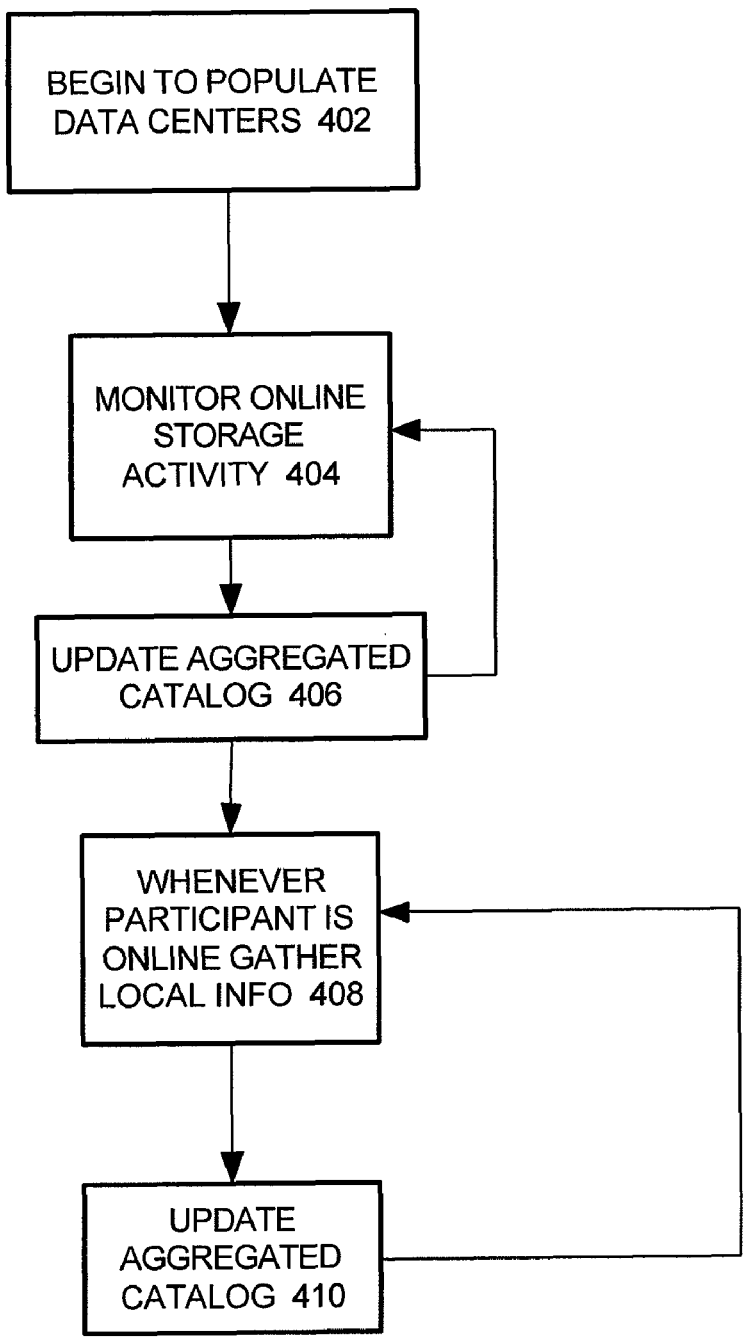
FIG. 4 is a flowchart of an operational sequence of background operations for operating the data management system of FIG. 1.

FIG. 4 shows a sequence 400 of background operations, which broadly serve to maintain the aggregated catalog 112a according to member activity. For ease of illustration, without any intended limitation, the example of FIG. 4 is described in the context of the system 100 described above. Also, for ease of discussion, the example of FIG. 4 is explained in the context of a single exemplary member (the "subject" member).

The steps 400 are initiated in step 402, which occurs some time after the subject member subscribes, signs up, registers, or otherwise enrolls in the OSP's services. In step 402, the facility 111 begins to populate the data centers 112b-112f with various content related to the member's online activities. Some examples of step 402 include the member receiving e-mails, uploading photographs, sending/receiving e-mail attachments, and other activities that all involve storing data objects for the member in 112b-112f.

In step 404, the aggregator 108 monitors activity in the data centers 112b-112f related to the subject member. This is conducted in order to identify newly arriving data objects that are (1) of the prescribed types tracked by the catalog 112a, and (2) owned by the member. "Newly arriving" means that the data objects are not yet shown in the metadata 112a. In one example, this may be conducted by the aggregator 108 reviewing the storage 112b-112f (or metadata listings of the storage) to identify newly arriving data objects of the member that have not been logged into the catalog 112a. This task may be conducted repeatedly according to a periodic, non-periodic, or other schedule. In addition to reviewing the storage 112b-112f itself, step 404 may additionally include the aggregator 108 monitoring online activity of the member (for example, in "real time") to determine when any of the member's activity has created or updated any stored data objects in the data centers 112b-112f. In both of the previous examples, the aggregator 108 updates the catalog 112a (step 406) to reflect the newly identified data objects (if any).

Step 408 occurs whenever the member computer 102 is connected to the online facility 111, that is, whenever the member is online. Here, the aggregator 108 communicates with the member computer 102 to gather information concerning the contents of the local storage 102b, to identify any data objects that (1) have one of the prescribed types tracked by the catalog 112a, and (2) are "new" in the sense that they do not appear in the catalog 112a yet. In one example, step 408 is performed by the local interface 102c scanning the local storage 102b (while online or offline) and providing the aggregator 108 with a corresponding report (while online). The interface 102c may send this report automatically or upon request from the aggregator 108. In another example, the interface 102c works online and offline to continually track the data objects added to 102b since last reporting to the aggregator 108, and therefore limits the report of step 408 to these data objects. In step 410, the aggregator 108 updates the aggregated catalog 112a to reflect the updates reported in step 408.

User Operations

Figure 5:
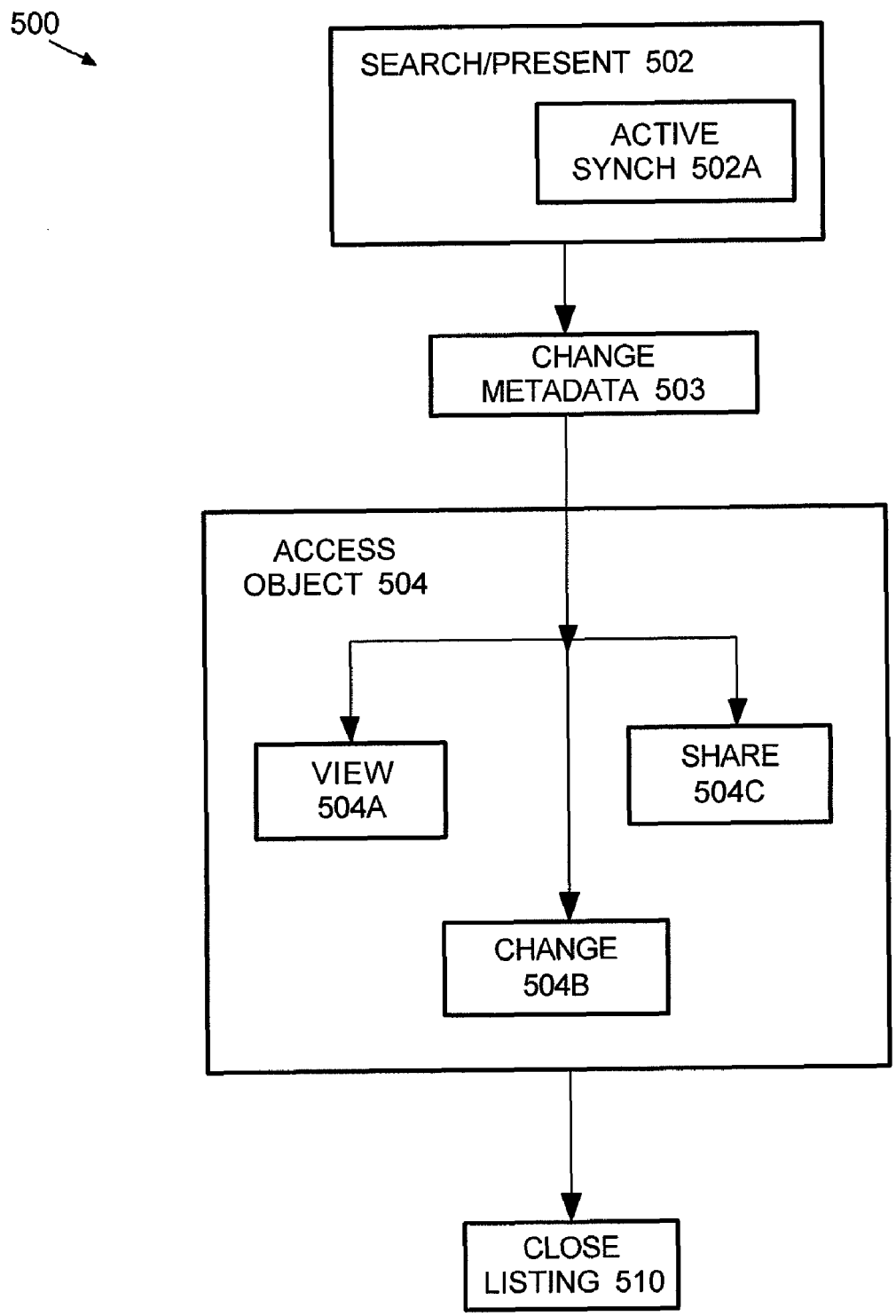
FIG. 5 is a flowchart of an operational sequence of user operations, and namely, utilizing the system of FIG. 1 to perform an omnibus search providing a consolidated view of an online service subscriber's online and local data objects.

FIG. 5 shows a sequence 500 of user operations which are made possible by the aggregated catalog 112a that is prepared and maintained as discussed above. For ease of illustration, without any intended limitation, the example of FIG. 5 is described in the context of the system 100 described above. Also, for ease of discussion, the example of FIG. 5 is explained in the context of a single exemplary member. Furthermore, as ordinarily skilled artisans (having the benefit of this disclosure) will be familiar with techniques for user authentication, the details of such procedures are omitted for the sake of brevity, although it is understood that preceding step 502 the online facility 111 requires such authentication as a condition to permitting the member to engage in the steps 502-510.

Step 502 is initiated in response to the member's request to view an omnibus listing of the member's data objects, this request being submitted to the finder 109 while the member computer 102 is connected to the online facility 111. As a more particular example, step 502 may be initiated by the member's invocation of a browser feature of the local OS 102a, a desktop icon, menu entry, or other user selectable control which, in turn, forwards the member's request to the finder 109. The browser of the local OS 102a also receives any user instructions to initially or subsequently narrow the search according to data objects' date, author, size, keywords (discussed below), file type, or any other metadata field. The interface 102c passes the request along with any refinements to the finder 109.

In response to the member request, the finder 109 returns a consolidated listing of the member's data objects for display at the member computer 102. The listing is consolidated because it includes data objects whether located in online storage or local storage. This listing is obtained by the finder 109 searching the aggregated catalog 112a for entries corresponding to the current member. The listing as presented at the computer 102 may show data objects by graphics, text, image thumbnails, icons, or any useful presentation.

Optionally during step 502, the finder 109 and/or interface 102c may provide more detailed, context appropriate views responsive to member actions. For example, when e-mail is selected, AOL MAIL or another context appropriate view may be supplied. Similarly, when photographs are selected, YOU'VE GOT PICTURES or another context appropriate view may be given.

While the consolidated listing is being displayed (starting in step 502), step 503 gives the member an opportunity to change certain metadata pertaining to the listed data objects. Namely, the display of listed data objects includes graphics, icons, text, menus, or other controls permitting the user to enter/change one or more keywords in association with each listed data object. The interface 102c senses user entry of such keywords, and transmits them to the finder 109, which stores the new keywords (with links to the respective data objects) in the aggregated catalog 112a.

During presentation of the consolidated listing in step 502, an "active synch" operation 502a is also performed. Namely, during display of the consolidated listing at the members computer, the finder 109 updates the display in real time to include any data objects that are first logged into the catalog 112a while the member's search window is open.

After the consolidated listing is initially displayed in step 502, and refined and redisplayed as desired, the finder 109 and/or interface 102c responds to any user requests to activate further processing of any specific data objects identified by the listing (step 504). In one embodiment, the consolidated listing includes a member-activated VIEW feature. In response to member activation of this feature for any one of the listed data objects (step 504a), the interface 102c activates local software (appropriate for the data object's particular file type) to view the data object. In a different embodiment, the finder 109 activates online software to view the data object. In the case of a digital photograph, for instance, the interface 102c or finder 109 may invoke MS INTERNET EXPLORER or another program.

Optionally, the consolidated listing may include a member-activated CHANGE feature. In response to user activation of this feature for the data object being viewed (step 504b), or any other listed data objects, the finder 109 or interface 102c activates local or online software (appropriate to the data object's particular file type) to manipulate the data object. In the case of a MS Word document, for instance, the finder 109 or finder 109 may activate the MS Word program.

The consolidated listing may also include a member-activated SHARE feature. In response to user activation of this feature for the data object being viewed (step 504c), or any other listed data objects, the finder 109 or interface 102c calls upon the aggregator 108 to e-mail the data object to a designated transferee, post the data object for viewing by the transferee, etc. The transferee may comprise another device 106 of the member, or even a third party 104. In one example, rather than actually copying and sending the data object, the aggregator 108 may provide the transferee with a link or pointer to the existing instance of the data objects in 112b-112f. One example of this is member placement of a particular data object into a "share" folder, to which any transferees are notified either automatically by the online facility 111 or manually by the member.

When the member is finished reviewing the data object listing of step 502, and conducting any desired follow-up viewing, manipulating, and transferring, the member closes the listing (step 510). As an example, the member may select an appropriate graphics or text option to close the browser of the local OS 102a.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To illustrate one exemplary embodiment, various functional aspects of the invention have been described in terms of illustrative components, blocks, modules, circuit, and steps. Whether such functionality is implemented as hardware, software, or both depends upon the particular application and design constraints imposed on the overall system. Skilled artisans may implement the described functionality in varying ways for each particular application without such implementation decisions departing from the scope of the present invention.

The invention claimed is:

1. A computer-implemented method for operating an online service facility selectively accessed by multiple end-user computers, the online service facility including a plurality of online data centers operated by an online service provider (OSP) to store end-users' data objects relating to a variety of online services that the OSP renders to its end-users, the method comprising operations of:
providing an aggregated catalog that contains information including:
(1) metadata identifying end-users' data objects residing in the online data centers, and
(2) metadata identifying end-users' data objects residing in respective end-user computers;
detecting new storage objects in the online data centers comprising newly arriving prescribed types of data objects owned by the end-users;
communicating with the end-user computers to identify prescribed types of data objects newly stored in the end-user computers;
updating the aggregated catalog to list the newly stored data objects from the online data centers and the newly stored data objects from end-user computers; and
responsive to each request by an end-user, searching the aggregated catalog and utilizing results of the search to provide an output for display at the requesting end-user's computer, the output comprising a consolidated listing of data objects of the end-user residing in the online data centers and data objects of the end-user residing in the end user's computer, wherein the consolidated listing includes an end-user-activatable CHANGE feature; and
wherein the operations further comprise, responsive to a given end-user's activation of the CHANGE feature in conjunction with a particular one of the listed data objects, activating software to modify contents of the particular data object by the given end-user.

2. The method of claim 1, where the operations further comprise: during display of the consolidated listing at the requesting end-user's computer, updating the display substantially in real time to reflect any data objects that are of prescribed types, owned by the requesting end-user, and newly stored in the online data center during the display.

3. The method of claim 1, where the detecting operation is carried out by at least one of the following operations:
communicating with the data centers to identify data objects contained therein; and
monitoring communications conducted between end-users and the online service facility.

4. Data management equipment for use in an online service facility selectively accessed by multiple end-user computers, the online service facility including a plurality of online data centers operated by an online service provider (OSP) to store end-users' data objects relating to a variety of online services that the OSP renders to its end-users, the equipment comprising:
an aggregated catalog including:
(1) at least one data store residing in at least one of the data centers, said at least one data store containing metadata identifying end-users' data objects,
(2) at least one data store residing in respective end-user computers containing metadata identifying end-users' data objects;

an aggregator, the aggregator comprising a processor programmed to perform operations, comprising:
detecting new storage in the online data centers of prescribed types of data objects owned by the end-users;
communicating with the end-user computers to identify prescribed types of data objects newly stored in the end-user computers;
updating the aggregated catalog to list to include metadata identifying the newly stored data objects contained in the online data centers and the newly stored data objects from the end-user computers; and
a finder, the finder comprising a processor programmed to perform operations comprising, responsive to each request by an end-user, searching the aggregated catalog and utilizing results of the search to provide an output for display at the requesting end-user's computer, the output comprising a consolidated listing of data objects of the end-user residing in the online data centers and data objects of the end-user residing in the end-user's computer;
where the finder is further programmed such that:
the consolidated listing includes an end-user-activatable CHANGE feature;
the operations performed by the finder further comprise, responsive to a given end-user's activation of the CHANGE feature in conjunction with a particular one of the listed data objects, activating software to modify the particular data object by to the given end-user.

5. The equipment of claim 4, where the finder is further programmed to perform operations comprising: during display of the consolidated listing at the requesting end-user's computer, updating the display substantially in real time to reflect any data objects that are of prescribed types, owned by the requesting end-user, and newly stored in the online data center during the display.

6. The equipment of claim 4, where the aggregator is programmed such that the detecting operation is carried out by at least one of the following operations:
communicating with the data centers to identify data objects contained therein; and
monitoring communications conducted between end-users and the online service facility.

7. Data management equipment for use in an online service facility selectively accessed by multiple end-user computers, the online service facility including a plurality of online data centers operated by an online service provider (OSP) to store end-users' data objects relating to a variety of online services that the OSP renders to its end-users, the equipment comprising:
aggregated catalog means for storing information including:
(1) metadata identifying end-users' data objects residing in the online data centers, and
(2) metadata identifying end-users' data objects residing in respective end-user computers;
aggregator means comprising a processor programmed for:
detecting new storage in the online data centers of prescribed types of data objects owned by the end-users;
communicating with the end-user computers to identify prescribed types of data objects newly stored in the end-user computers;
updating the aggregated catalog to list to include metadata identifying the newly stored data objects contained in the online data centers and the newly stored data objects from the end-user computers; and finder means, comprising a processor programmed for, responsive to each request by a end-user, searching the aggregated catalog means and utilizing results of the search to provide an output for display at the requesting end-user's computer, the output comprising a consolidated listing of data objects of the end-user residing in the online data centers and data objects of the end-user residing in the end user's computer, wherein the consolidated listing includes an end-user-activatable CHANGE feature; and wherein the operations further comprise, responsive to a given end-user's activation of the CHANGE feature in conjunction with a particular one of the listed data objects, activating software to manipulate the particular data object to the given end-user.

\* \* \* \* \*